US012784111B2

(12) United States Patent
Meoli et al.

(10) Patent No.: US 12,784,111 B2
(45) Date of Patent: Nov. 3, 2026

(54) METHODS AND SYSTEMS FOR PROVIDING DIGITAL IDENTIFICATION CARDS FOR MOBILE APPLICATIONS

(71) Applicant: Government Employees Insurance Company (GEICO), Fredericksburg, VA (US)

(72) Inventors: Peter Meoli, Elkridge, MD (US); Matthew Slocum, North Bethesda, MD (US); Anthony James, Gaithersburg, MD (US); Derek Switzer, Chevy Chase, MD (US)

(73) Assignee: Government Employees Insurance Company (GEICO), Fredericksburg, VA (US)

( * ) Notice: Subject to any disclaimer, the term of this patent is extended or adjusted under 35 U.S.C. 154(b) by 0 days.

(21) Appl. No.: 19/057,218

(22) Filed: Feb. 19, 2025

(65) Prior Publication Data

US 2025/0191075 A1 Jun. 12, 2025

Related U.S. Application Data

(63) Continuation of application No. 17/328,339, filed on May 24, 2021, now Pat. No. 12,248,990, which is a continuation of application No. 16/385,200, filed on Apr. 16, 2019, now Pat. No. 11,042,943, which is a continuation of application No. 15/082,397, filed on Mar. 28, 2016, now Pat. No. 10,296,980, which is a continuation of application No. 13/764,431, filed on Feb. 11, 2013, now Pat. No. 9,325,807.

(60) Provisional application No. 61/721,235, filed on Nov. 1, 2012.

(51) Int. Cl.

| | |
|---|---|
| ***G06Q 40/08*** | (2012.01) |
| ***B42D 25/00*** | (2014.01) |
| ***G06F 40/103*** | (2020.01) |
| ***H04L 67/01*** | (2022.01) |
| *G06Q 50/26* | (2012.01) |

(52) U.S. Cl.

CPC ............ *G06Q 40/08* (2013.01); *B42D 25/00* (2014.10); *G06F 40/103* (2020.01); *H04L 67/01* (2022.05); *G06Q 50/265* (2013.01)

(58) Field of Classification Search

CPC ....... G06Q 20/36; G06Q 40/08; G06F 40/103

See application file for complete search history.

(56) References Cited

U.S. PATENT DOCUMENTS 6,546,400 B1 4/2003 Aberson
7,047,041 B2 5/2006 Vänskä et al.
7,571,211 B1 * 8/2009 Melick .................... H04L 67/52 379/88.13

(Continued)

*Primary Examiner* — Chirag R Patel

(74) *Attorney, Agent, or Firm* — Sterne, Kessler, Goldstein & Fox P.L.L.C.

(57) ABSTRACT

The disclosed embodiments include methods and systems for providing digital identification cards are disclosed. In one aspect, the disclosed embodiments may provide digital identification cards, such as proof of insurance cards, to mobile devices that are compliant with one or more standards set by identification-requiring organizations, such as a department of motor vehicles. Certain disclosed embodiments may update digital identification cards based on changes to user information or formatting information associated with one or more identification-requiring organizations.

20 Claims, 12 Drawing Sheets

(56) References Cited

U.S. PATENT DOCUMENTS

| | | | | |
|---|---|---|---|---|
| 2001/0018660 | A1 | 8/2001 | Sehr | |
| 2003/0061154 | A1 | 3/2003 | Chacko | |
| 2003/0154138 | A1 | 8/2003 | Phillips | |
| 2004/0040086 | A1 * | 3/2004 | Eisenberg | G16H 40/63<br>5/81.1 R |
| 2004/0049401 | A1 | 3/2004 | Carr | |
| 2004/0099731 | A1 | 5/2004 | Olenick | |
| 2005/0182741 | A1 | 8/2005 | Grossman | |
| 2006/0282771 | A1 | 12/2006 | Vinci | |
| 2006/0293905 | A1 | 12/2006 | Ramanathan | |
| 2007/0121803 | A1 | 5/2007 | Koepke et al. | |
| 2007/0158411 | A1 | 7/2007 | Krieg | |
| 2008/0033818 | A1 | 2/2008 | Avissar | |
| 2008/0268811 | A1 | 10/2008 | Beenau et al. | |
| 2009/0025071 | A1 | 1/2009 | Mumm et al. | |
| 2009/0157732 | A1 | 6/2009 | Hao et al. | |
| 2009/0159509 | A1 | 6/2009 | Wojdyla et al. | |
| 2009/0179073 | A1 | 7/2009 | Holz | |
| 2009/0272797 | A1 | 11/2009 | Doman et al. | |
| 2010/0174564 | A1 | 7/2010 | Stender | |
| 2010/0174750 | A1 | 7/2010 | Donovan et al. | |
| 2010/0220175 | A1 | 9/2010 | Claydon | |
| 2010/0332330 | A1 | 12/2010 | Goel et al. | |
| 2011/0053559 | A1 | 3/2011 | Klein | |
| 2011/0126287 | A1 | 5/2011 | Yoo | |
| 2011/0270617 | A1 | 11/2011 | Pacheco et al. | |
| 2012/0173439 | A1 | 7/2012 | Levy | |
| 2012/0191612 | A1 | 7/2012 | Spodak et al. | |
| 2012/0290449 | A1 | 11/2012 | Mullen | |
| 2013/0080322 | A1 | 3/2013 | Adolphe | |
| 2014/0081670 | A1 | 3/2014 | Lim et al. | |

* cited by examiner

200

METHODS AND SYSTEMS FOR PROVIDING DIGITAL IDENTIFICATION CARDS FOR MOBILE APPLICATIONS

RELATED APPLICATIONS

This application is a continuation of U.S. patent application Ser. No. 17/328,339, filed May 24, 2021 (pending), which is a continuation of U.S. patent application Ser. No. 16/385,200, filed Apr. 16, 2019 (U.S. Pat. No. 11,042,943), which is a continuation of U.S. patent application Ser. No. 15/082,397, filed Mar. 28, 2016 (U.S. Pat. No. 10,296,980), which is a continuation of U.S. patent application Ser. No. 13/764,431, filed Feb. 11, 2013 (U.S. Pat. No. 9,325,807), which claims benefit of U.S. Provisional Application No. 61/721,235, filed Nov. 1, 2012, each of the above-referenced applications are hereby incorporated by reference in its entirety.

TECHNICAL FIELD

The present disclosure relates generally to the field of providing digital identification information, and more particularly, to systems and methods for providing digital identification information to mobile devices of account holders.

BACKGROUND OF THE DISCLOSURE

Many agencies and organizations require individuals to identify themselves or provide identification information associated with themselves. For example, states may require individuals who drive to purchase automobile insurance and to carry proof of insurance identification cards when they are driving.

The use of hardcopy identification cards does have drawbacks. For example, when the identification information for an individual changes, a new identification card must be issued, and many identification cards are only issued by the issuing agency (i.e., the account holder cannot create his own identification card). Often a new identification card must be mailed to the account holder, causing a delay of several days between the issuance of the card and the receipt of it by the user. Alternatively, the account holder may go in-person to the issuing agency, which may be inconvenient to the account holder as well as cause a delay in the account holder's obtaining an accurate hardcopy of the identification card. Hardcopy identification cards are subject to damage and can become illegible over time. The cost of issuing identification cards can be significant for issuing agencies; more durable cards may be more expensive to issue and less durable cards may need to be replaced more frequently. And issuing agencies must spend resources on providing employees to handle the issuance of new hardcopy identification cards.

To overcome the drawbacks of hardcopy identification cards, applications providing digital identification cards have been developed that are accessible on mobile devices. Applications on mobile devices, such as the iPhone® or the iPad®, have fast become a growing trend in the smartphone and tablet markets. The development of mobile applications (mobile apps) has drastically increased in recent years as more and more users of mobile devices gravitate towards the user-friendly functionality of a mobile app over the Internet browser. As a result, many businesses and organizations are developing mobile apps that include digital identification information. Insurance companies, such as GEICO®, are among those businesses developing such mobile apps. Such mobile apps are available to policyholders for the company's insurance products and services.

However, organizations that require identification information from individuals often have rules and regulations about the format of the identification information that they will accept. Because these organizations are familiar with hardcopy identification cards, the rules are often directed to such things as the formatting of the identification card, the font size used, the placement of certain pieces of information, etc. These rules ensure that all identification cards are uniform, and this uniformity allows the individuals checking the cards to efficiently find the needed identification information since the information can always be found in the same place.

For example, the State of New York may require that its drivers maintain automobile insurance that complies with its minimum liability limits, but it may not require the proof of insurance identification cards that explicitly state that the insurance policy meets the minimum liability limits prescribed by New York law. However, the State of Maryland may require that its drivers carry proof of insurance identification cards that explicitly state that the insurance policy meets the minimum liability requirements prescribed by Maryland law. An insurance policy holder moving from New York to Maryland must obtain a new proof of insurance identification card that complies with the new jurisdiction's regulations for both the content of the identification card and the formatting of the identification card.

Thus, there is a need to provide a mobile app that provides account holders a digital identification card that complies with organizations' formatting requirements and that can be updated with new identification information or to comply with different formatting requirements.

SUMMARY

The disclosed embodiments include methods, systems, and articles of manufacture that provide digital identification cards that are compliant with one or more standards of one or more identification-requiring organizations. In one embodiment, a mobile device may be provided that may be configured to generate a digital identification card compliant with one or more standards of an identification-requiring organization. The mobile device may include a memory storing software instructions and a processor configured to execute the software instructions. In one embodiment, the processor may be configured to receive formatting information associated with an identification-requiring organization from a digital identification server. Further, the processor may be configured to receive identification information from the digital identification server. The processor may be further configured to receive a request to display the digital identification card, generate the digital identification card based on the identification information and the formatting information, and generate data that is used to display the digital identification card with information that is compliant with the one or more standards of the identification-requiring organization. In one embodiment, the software instructions may be associated with a digital identification mobile application stored in the memory of the mobile device.

In another embodiment, the processor of the mobile device may be configured to generate the digital identification card based on formatting information associated with the identification-requiring organization, such as, for example, field position, field size, field shape, type of font, font size, color of text, color of field, color of background, transparency of text, transparency of color, transparency of field, text to display, image information, and watermark information.

In another embodiment, the processor of the mobile device may be further configured to update the digital identification card based on changes to the identification information or changes to the formatting information associated with the identification-requiring organization. In another embodiment, the processor of the mobile device may be configured to transmit updated identification information to the digital identification server.

The processor of the mobile device may also be configured to store the digital identification card in the memory and configured to generate data that is used to display the stored digital identification card in response to a request for the digital identification card.

In another aspect, the processor of the mobile device may be configured to transfer identification information to a device of an identification-requiring organization or third party.

The method may further include receiving new formatting information associated with the identification-requiring organization and updating the format of the digital identification card based on the new formatting information.

The method may also include receiving new identification information and updating the identification information displayed in the digital identification card based on the new identification information using the digital identification generation application.

The disclosed embodiments may also include a computer-implemented method for providing digital identification cards relating to insurance policies. The method may include receiving, by a mobile device, formatting information associated with the identification-requiring organization from a digital identification server. The method may further include receiving, by the mobile device, identification information from the digital identification server and receiving, by the mobile device, a request to display the digital identification card. The method may also include generating, by the mobile device, the digital identification card based on the identification information and the formatting information and displaying, by the mobile device, the digital identification card with information that is compliant with the one or more standards of the identification-requiring organization.

The method may further include receiving, by the mobile device, updated policyholder insurance information or updated formatting information associated with identification-requiring organizations. In another embodiment, the method may include providing new policyholder insurance information or new formatting information associated with identification-requiring organizations in response to receiving the updated information.

The disclosed embodiments may also include a server for providing digital identification cards relating to insurance policies. The server may include a memory storing software instructions and one or more processors configured to execute the software instructions to receive formatting information associated with the identification-requiring organization and receive identification information. The processor may also be configured to receive a request for the digital identification card and generate the digital identification card according to the formatting information and identification information. In one aspect, the processor may be configured to execute the software instructions to provide the digital identification card to a mobile device for display such that the digital identification card is displayed by the mobile device in accordance with the one or more standards of the identification-requiring organization.

The processor may be further configured to execute the software instructions to provide an updated digital identification card to the mobile device such that the updated digital identification card is displayed by the mobile device in accordance with the one or more standards of the identification-requiring organization.

The disclosed embodiments also include a computer-implemented method for providing digital identification cards relating to insurance policies. In one embodiment, the method may include receiving, by a digital identification server, a request from a mobile device associated with a policyholder of an insurance policy, the request including a request for policyholder insurance information and formatting information associated with an identification-requiring organization. The method may also include providing, by the digital identification server, the requested policyholder insurance information and formatting information associated with identification-requiring organization to the mobile device, such that the mobile device executes a digital identification mobile application to generate a digital identification card based on the policyholder insurance information and formatting information and display the generated digital identification card in accordance with one or more standards of the identification-requiring organization.

The disclosed embodiments may also include a server for providing digital identification cards relating to insurance policies. In one embodiment, the server may include a memory storing software instructions and one or more processors configured to execute the software instructions to provide insurance policyholder insurance information associated with a policyholder and formatting information associated with an identification-requiring organization that provides one or more standards for identification cards relating to insurance policies. The one or more processors may also execute the software instructions to provide to a mobile device a digital identification mobile configured to, when executed by a processor included in the mobile device, generate and display a digital proof of insurance identification card based on the policyholder insurance information and the formatting information such that the digital identification card is displayed by the mobile device in a format that is compliant with the one or more standards provided by the identification-requiring organization.

In another embodiment, the processor may be further configured to execute the software instructions to provide updated policyholder insurance information to the mobile device such that the digital identification mobile application updates the digital identification card according to the updated policyholder insurance information.

Additional aspects related to the disclosed embodiments are described in the description which follows, and in part will be obvious from the description, or may be learned by practice of the disclosed embodiments.

It is to be understood that both the foregoing general description and the following detailed description are exemplary and explanatory only and are not restrictive of the disclosed embodiments, as claimed.

DETAILED DESCRIPTION

Figure 1:
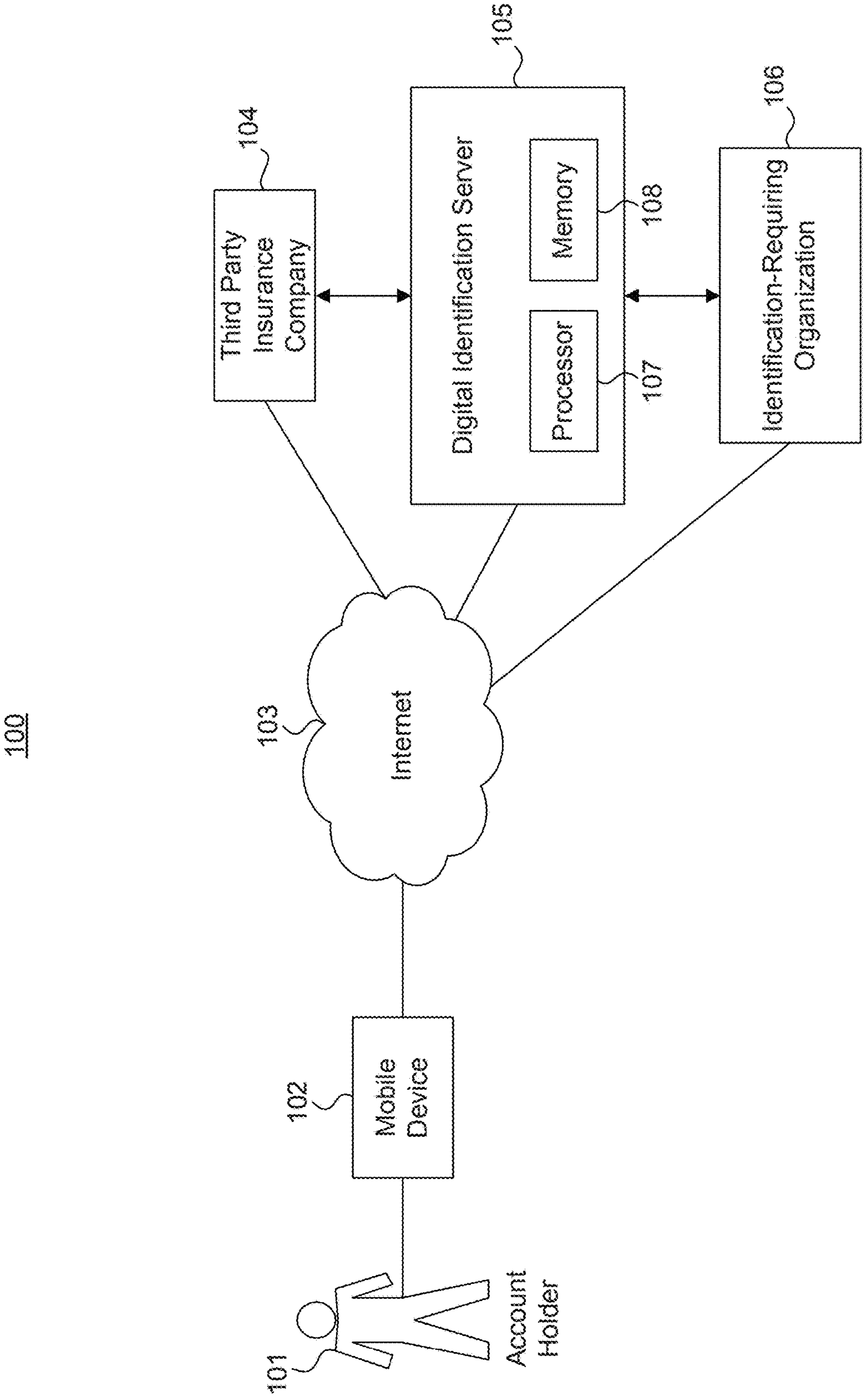
FIG. 1 illustrates an exemplary system for providing digital identification cards, consistent with certain disclosed embodiments.

Reference will now be made in detail to the disclosed embodiments, certain examples of which are illustrated in the accompanying drawings. One of ordinary skill in the art will recognize that the disclosed embodiments can be modified in various respects, all without departing from the spirit and scope of the disclosed embodiments. Accordingly, the drawings and descriptions are to be regarded as illustrative in nature, and not as restrictive. Wherever convenient, the same reference numbers will be used throughout the drawings to refer to the same or like parts.

Certain disclosed embodiments include methods and systems for providing digital identification cards to account holders' mobile devices which conform to the formatting standards set by an identification-requiring organization (IRO). In certain embodiments, the account holder's mobile device may be configured with a digital identification mobile app, configured to generate the digital identification card. In certain embodiments, the system (e.g., a digital identification server) of the account provider may be configured to generate the digital identification card.

In certain embodiments, the digital identification card may be re-formatted if an IRO's formatting standards or information requirements change, or a new identification card may be generated to comply with a new IRO's formatting standards and information requirements. In one embodiment, a digital identification mobile app provides an IRO with identification information or a subset of the identification information. In certain embodiments, the digital identification mobile app on the account holder's mobile device is configured to send updated identification information to the IRO and/or the account provider. In certain embodiments, a digital identification server program associated with the system of the account provider is configured to send updated identification to the IRO. Updates to the identification information or new formatting standards from the account provider, the account holder, or the IRO may be provided to the digital identification card application such that a digital identification card is generated to provide account holders their current account information in a format that complies with the IRO's formatting standards. In certain embodiments, the digital identification cards may be locally stored on the account holders' mobile devices.

In certain embodiments, digital identification cards may be digital representations of hard copy documents such as identification cards, account information cards, licenses, etc., which are associated with an account holder.

In certain embodiments, an account holder is not meant to be limited to only a person who has or is associated with an account. An account holder may be any person or entity with identification information that could be recognized by identification-requiring organizations. For example, an account holder may include an insurance policy holder (e.g., who may have associated identification information for the type of insurance policy and coverage they have, which would be recognized by an insurance company or a government agency requiring proof of insurance), a vehicle operator (e.g., who may have associated identification information regarding their qualifications for operating a vehicle, which would be recognized by law enforcement), a bank account holder (e.g., who may have bank account and personal identification information, which would be recognized at a bank), or a citizen (e.g., who may have residency and personal identification information, which would be recognized by a wide range of government and other agencies). In certain embodiments, an account holder may be an entity, such as a company, organization, etc.

In certain embodiments, identification information may include any information associated with a person or entity. Identification information may include personal identification information (e.g., name, date of birth, height, age, address, etc.), qualification information (e.g., the person's abilities or accomplishments, the person's title, etc.), or information associated with the account (e.g., the account number, how long the account has been open, the amount of coverage associated with the account, restrictions on the account, etc.). In other embodiments, identification information may be associated with product data. For example, identification information may include information associated with a coupon for a shopping mall (the IRO) where a particularly formatted digital coupon (the digital identification card) would be accepted by the shopping mall from whomever was in possession of the digital copy of the coupon. In this example, the identification information is not necessarily associated with the person in possession of the digital copy of the coupon.

In certain embodiments, accounts may be any type of account, such as insurance policies (e.g., home, automobile, life, etc.), financial accounts (e.g., credit card accounts, banking accounts, merchant accounts, etc.), or any type of account that may be associated with a user or entity.

In certain embodiments, IROs may be any type of organization that may require identification information to be formatted in a particular way for acceptance by the IRO. In some embodiments, the IRO issues identification cards with the identification information in the format it requires. In other embodiments, the IRO may rely on a third party to issue identification cards in the format the IRO requires. The IRO requiring the identification (or the third party supplying the identification) may include, for example, a government agency (e.g., a state's Department of Motor Vehicles, etc.), a business (e.g., an insurance company, etc.), or an organization (e.g., AAA, etc.). The term IRO, as used in this disclosure, may mean the organization requiring the identification or the individual representing the IRO. It is to be understood that IROs may also accept or require that identification information formatted to meet the standards of a separate IRO. For example, a police officer (e.g., a representative of a first IRO) may require a driver to provide a proof of insurance identification card formatted to meet the state's Department of Motor Vehicles' (e.g., a second IRO) standards.

In certain embodiments, formatting information may include identification card position data, such as, for example, data indicating a position where certain information may be presented on identification cards (e.g., location of data fields, etc.). Formatting information may also include field size, field shape, type of font, font size, color of text, color of field, color of background, transparency of text, transparency of color, transparency of field, text to display, image information, watermark information, etc.

FIG. 1 illustrates an exemplary system 100 for providing a digital identification card compliant with IRO requirements, consistent with the disclosed embodiments. System 100 includes, for example, an account holder 101 with access to a mobile device 102, a network, such as the Internet 103, one or more systems relating to a third party, such as an insurance company 104, one or more digital identification servers 105, and one or more IROs 106. One or more mobile devices 102 may be associated with an account holder 101. Account holder 101 may be a customer that has an insurance policy with insurance company 104. The insurance policy may cover automobile insurance, but is not limited to such an embodiment. Insurance company 104 may be an entity that provides insurance to customers (e.g., account holder 101). In other embodiments, insurance company 104 may be associated with another type of entity, such as a bank, entertainment company, or shopping company that provides identification cards relating to the businesses and services associated with that company. In other embodiments, insurance company 104 may be an entity that is contracted by IRP 106, or otherwise partnered with IRO 106, to provide identification cards for account holders or others requiring identification cards by IRO 106.

In certain embodiments, insurance company 104 may include one or more systems that are configured to execute software instructions to perform one or more processes consistent with the disclosed embodiments. In one aspect, insurance company 104 may include components, infrastructure, and other elements that enable insurance company 104 to provide insurance to customers and provide proof of insurance digital identification cards to customers. For example, insurance company 104 may include, for example, one or more computer components (e.g., servers, processors, memory devices storing software instructions that when executed by processor(s) perform insurance related processes, communication processes, and the like). Insurance company 104 may include systems that are geographically separated (e.g., servers distributed geographically in a locality, county, state, or the United States). Insurance company 104 may reflect a central system (e.g., a central server) that serves other systems (e.g., client computers, other servers, etc.) or insurance company 104 may reflect a single central system (e.g., a single centralized server) that also operates as the digital identification server 105. The configuration and architecture, and the underlying network, hardware, and software components implemented by the components of the one or more systems included in insurance company 104 is not intended to be limiting to the features and processes of the disclosed embodiments.

IRO 106 may be one or more IROs. In one embodiment, IRO 106 may include one or more components, infrastructure, and other elements that enable IRO 106 to issue identification card requirements, such as for example, to account holders 101. For example, IRO 106 may include one or more computer components (e.g., servers, processors, memory devices storing software instructions that, when executed by processor(s), execute insurance related processes, communication components, and the like). IRO 106 may include systems that are geographically separated (e.g., servers distributed geographically in a locality, county, state, or the United States). IRO 106 may reflect a central system (e.g., a central server) that serves other systems (e.g., client computers, other servers, etc.) or IRO 106 may reflect a single central system (e.g., a single centralized server). The configuration and architecture, and the underlying network, hardware, and software components implemented by the components of the one or more systems included in IRO 106, is not intended to be limiting to the features and processes of the disclosed embodiments.

In certain embodiments, IRO 106 may be connected to digital identification server 105. In certain embodiments, digital identification server 105 may be configured to send a request to IRO 106 to provide identification information for account holder 101 and formatting standards for a digital identification card. In one aspect, digital identification server 105 may issue a request on an as-needed basis (e.g., when account holder 101 changes residencies, digital identification server 105 may request the formatting standards associated with the new residency) or periodically (e.g., digital identification server 105 may request formatting standards once a week to ensure that the digital identification cards are always in compliance). In certain embodiments, IRO 106 may automatically provide identification information for account holder 101 and formatting standards for the digital identification card to digital identification server 105 without a request from digital identification server 105 on an as-needed basis (e.g., IRO 106 may send the updated standards to digital identification server 205 if formatting standards are changed), or periodically (e.g., once a month, the IRO may send a list of all account holders with driving violations or accidents to the digital identification server 105).

In certain embodiments, digital identification server 105 may electronically provide identification information to IRO 106 on an as-needed basis. For example, following an automobile accident, digital identification server 105 may be configured to execute software that provides IRO 106 the identification information of account holder 101 involved with the accident. Digital identification server 105 may also periodically provide identification information to IRO 106. For example, every month the digital identification server may send IRO 106 a list of account holders 101 who have changed their residencies. Digital identification server 105 may provide identification information to IRO 106 in response to a request from IRO 106 or automatically without a request from IRO 106. In certain embodiments, requests for electronic transfer of information between digital identification server 105 and IRO 106 may originate with any entity in system 100 (i.e., account holder 101, insurance company 104, digital identification server 105, or IRO 106).

Account holder 101 may be an individual that is a policy holder of a policy from insurance company 104. Alternatively, account holder 101 may be an entity that is a customer of insurance company 104, such as a corporation, partnership, company, government agency, municipality, or other form of business or government entity that maintains insurance for its employees. In other embodiments involving companies other than an insurance company, account holder 101 may be a customer of that company, such as a customer with an account provided by a banking company, entertainment company, retail company, and the like.

Account holder 101 may be associated with one or more mobile devices 102 that are configured to connect to a network, such as Internet 103. In certain embodiments, the network may be any type of communication network configured to transmit information between the components of system 100. For example, the network may include a wireless and/or wireline network components (e.g., hardware, software, and/or firmware) configured to receive, route, translate, and deliver information. For example, the network may include the Internet, an extranet, and Intranet, a Local Area Network, etc. and include infrastructure that implements the communication of information over these types of networks, such as wireless/wireline base stations, transceivers, and related technology. While FIG. 1 illustrates the network as the Internet 103, other types of networks and communication infrastructures may be implemented with the disclosed embodiments.

Mobile device 102 may consist of smartphones, tablets, and/or any type of mobile device with computing capabilities, such as iPhone®, iPad®, Blackberry®, or Android® type mobile devices. Mobile device 102 may be capable of downloading and executing software, such as mobile apps. In one embodiment, mobile device 102 may be any type of computing device that is capable of executing mobile apps. Mobile device 102 may include one or more processors and memory devices storing software instructions that, when executed by the mobile device processors, perform one or more operations consistent with the disclosed embodiments. Mobile device 102 may also include components that provide communications with Internet 110 or other computing components, such as other mobile devices.

In other embodiments, mobile device 102 may be a laptop or a non-mobile device, such as a desktop computer, kiosk, etc.

In one embodiment, mobile device 102 may connect to one or more digital identification servers 105 through a wireless connection to the Internet 103. In other embodiments, mobile device 102 may connect to digital identification server 105 through cloud-based computing. Digital identification server 105 may be one or more computers configured to receive requests for information over a network (e.g., Internet 103) and provide information to components over a network (e.g., Internet 103). For example, in one embodiment, digital identification server 105 may include one or more computer or data processing devices that have hardware (e.g., processors, storage memory, data buses, network interface, etc.) and/or software (e.g., application programs, operating systems, other executable program code written in any known programming languages). In one example, digital identification server 105 may include one or more processors 107 and one or more memory devices (memory 108). Processor 107 may be known processor devices configured to execute software instructions stored on memory devices, such as memory 108. Memory 108 may be one or more memory devices configured to store software instructions that, when executed by processor 107, perform one or more processes consistent with certain disclosed embodiments.

In one embodiment, digital identification server 105 may be associated with insurance company 104. For example, digital identification server 105 may be provided by an entity that works with, partners with, etc. insurance company 104. In another embodiment, digital identification server 105 may be part of insurance company 104.

In certain embodiments, digital identification server 105 may contain digital identification server programs such as a digital identification application program and a digital identification card generation program. The digital identification application program may generate and/or store a digital identification mobile app and transmit the digital identification app to mobile devices (e.g., mobile device 102). The digital identification card generation program may generate a digital identification card. In certain embodiments, one or more of these functions may be provided by other entities. For example, a mobile app provider or app store (e.g., a third party entity system) may store and transmit the digital identification mobile app to mobile device 102. As another example, a digital identification mobile app on mobile device 102 may be configured to generate the digital identification card. In one aspect, the digital identification card mobile app may be configured to generate one or more digital identification cards that comply with the formatting and identification information requirements of IRO 106.

System 100, or one or more components of system 100, may be configured to execute processes that provide efficient, secure, and user friendly digital identification cards relating to insurance policies provided by insurance company 104.

Figure 2:
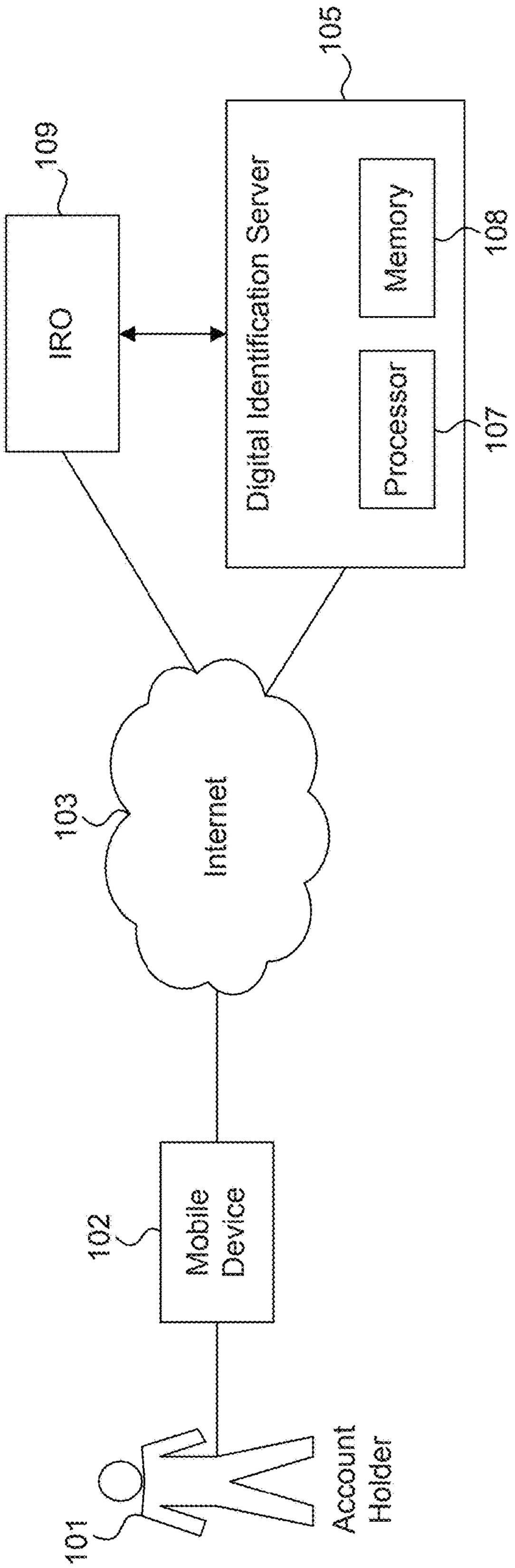
FIG. 2 illustrates another exemplary system for providing digital identification cards including an identification-requiring organization that may be associated with an identification card provider, consistent with certain disclosed embodiments.

FIG. 2 illustrates an exemplary system 200, including an IRO 107 that is both an identification-requiring organization and a digital identification issuing organization.

In this embodiment, IRO 107 may be configured to provide the functionality of IRO 106 and insurance company 104 in system 100 of FIG. 1. In one embodiment, digital identification server 105 may be associated with IRO 107. For example, digital identification server 105 may be associated with a mobile app service provider that provides the digital identification mobile app to mobile device 102 for IRO 107. In one aspect, the digital identification card mobile app may be configured to generate one or more digital identification cards that comply with the formatting and identification information requirements of IRO 107. In another embodiment, digital identification server 105 may be part of IRO 107. IRO 107 and digital identification server 105 may be configured to transfer identification information similar to the ways described in relation to the transfer of information between IRO 106 and digital identification server 105 in system 100. Any entity in system 200 may be configured to transfer information (i.e., account holder 101, IRO 107, or digital identification server 105).

Figure 3:
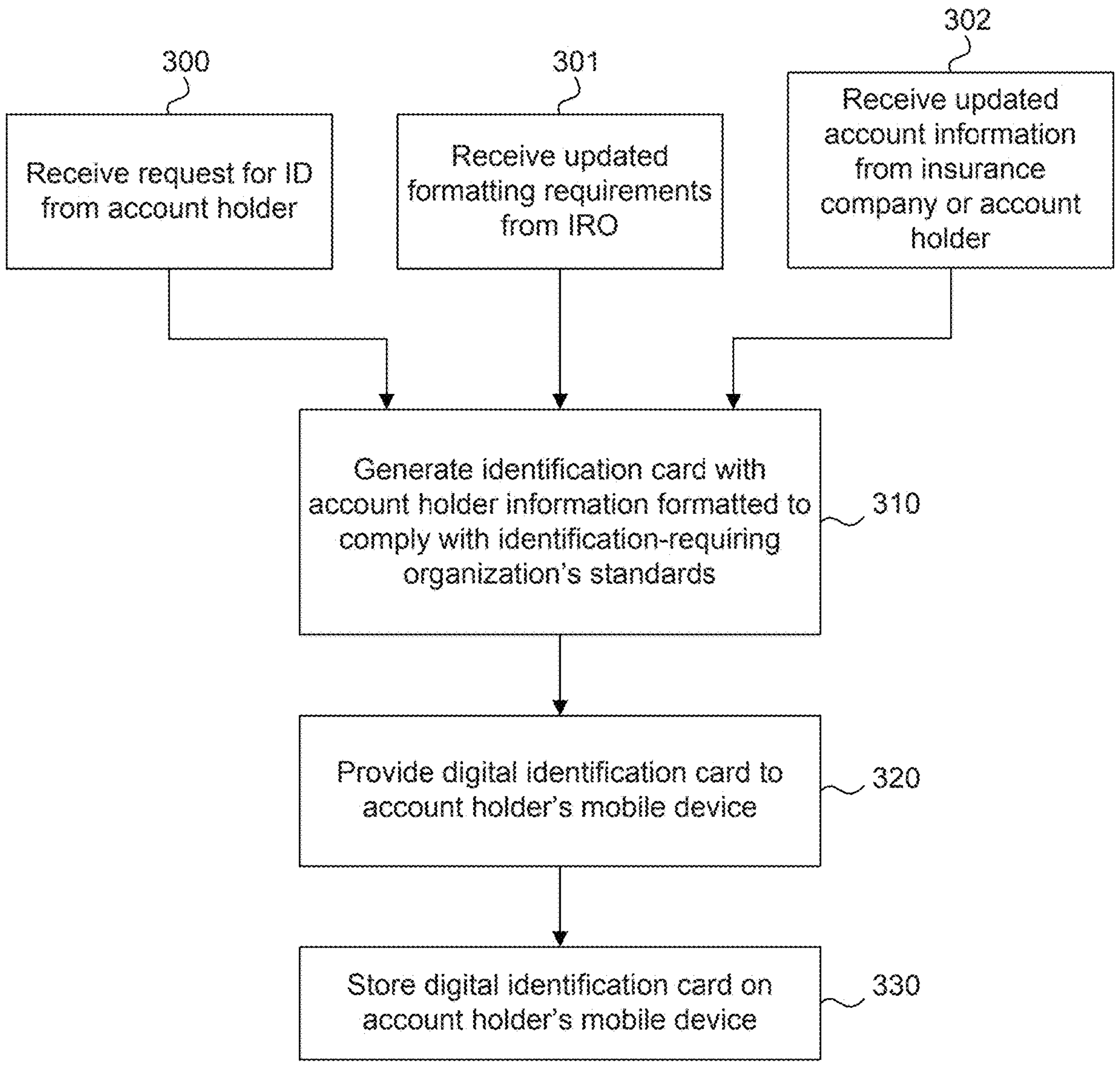
FIG. 3 illustrates a flowchart of an exemplary digital identification card generation process, consistent with certain disclosed embodiments.

FIG. 3 illustrates a flowchart of an exemplary digital identification card generation process consistent with the disclosed embodiments. FIG. 3 is described in reference to system 100 of FIG. 1, but one of skill in the art would understand how this description would apply to system 200 and other disclosed embodiments.

In one embodiment, digital identification server 105 may be configured to execute software instructions that perform one or more steps of the digital identification card generation process. For example, one or more processors 107 may be configured to execute software instructions stored in memory 108 to perform one or more steps of the digital identification card generation process of FIG. 3. In step 300, digital identification server 105 may receive a request to download a digital identification card. For example, account holder 101 may use mobile device 102 to initiate the request, which is communicated to digital identification server 105 over Internet 103. Alternatively, digital identification server 105 may initiate the digital identification card generation process upon receiving updated digital identification card formatting requirements from insurance company 104 or IRO 106. Such updates may trigger that a new digital identification card is to be issued to account holder 101 in order to be compliant with one or more standards of IRO 106. In other aspects, digital identification server 105 may execute the digital identification card generation process automatically in response to an event, a time period, or other events, such as when account holder 101 becomes a customer of insurance company 104. Other events may be implemented that trigger the provision of identification information for use by digital identification server 105 to generate a digital identification card for account holder 101.

In response to a request or receipt of updated formatting standards, digital identification server 105 may execute instructions that generate the digital identification card for account holder 101 (Step 310). In certain embodiments, digital identification server 105 may generate the digital identification card from identification information supplied by insurance company 104. In such embodiments, computer components (e.g., processor(s) executing instructions stored on memory device(s)) for insurance company 104 may provide digital identification server 105 with information relating an insurance policy of account holder 101. In certain embodiments, digital identification server 105 may generate the digital identification card from identification information supplied by IRO 106. In certain embodiments, digital identification server 105 may generate the digital identification card from identification information supplied by account holder 101. In certain aspects, digital identification server 105 may generate the digital identification card from identification information supplied by a combination of these sources of identification information.

After the digital identification card is generated, digital identification server 105 may provide the digital identification card to mobile device 102 of account holder 101 over a network, such as Internet 103 (Step 320). Mobile device 102 may receive and store the digital identification card using known processes and mechanisms for downloading and storing digital information (Step 330).

In certain embodiments, mobile device 102 may generate the digital identification card. For example, the digital identification mobile app of mobile device 102 may be configured to generate the digital identification card. In one aspect, mobile device 102 may download from digital identification server 105, using the digital mobile app, identification data, and a template for the digital identification card that complies with requirements of IRO 106. In certain embodiments, mobile device 102 may download a separate document format (e.g., a PDF) of the identification card, which is separate from a generated digital identification card. In certain embodiments, digital mobile app of mobile device 102 may generate the digital identification card by formatting the relevant identification information to the dynamic specifications of the digital identification card template. The properly formatted digital identification card, the document format of the identification card, the identification information, and the display specifications (e.g., the template) may be saved to mobile device 102. The digital identification mobile app of mobile device 102 may subsequently generate or update the digital identification card without contacting or downloading additional data from digital identification server 106.

For example, Table 1 below lists exemplary data that may be associated with automobile insurance policy holders that is stored in identification server 105 and/or mobile device 102 and used to render a digital identification card for the account holder associated with mobile device 102.

TABLE 1

| |
|---|
| Documents or images of documents, such as: |
| Document format of identification card |
| Policy information for each Policy, including: |
| Policy Number |
| Effective Date of Policy |
| Policy Expiration Date |
| Name of Policy Holder |
| Name of Co-Insured Name |
| Address of Insured-Line 1 |
| Address of Insured-Line 2 |
| State of Insured |
| Company Employing the Insured |
| Cell Phone Number |
| Home Phone Number |
| Work Phone Number |
| Vehicles that are Eligible for Identification Cards (i.e., covered by the policy) |
| Future Effective Date for Renewed Policies |
| Driver information for each Driver under the Policy, including: |
| Driver Name |
| Driver's License Number |
| Vehicle information for each Vehicle under the Policy, including: |
| Year of Vehicle |
| Make of Vehicle |
| Model of Vehicle |
| Vehicle Identification Number (VIN) |
| Name of Owner of Vehicle |
| Name of Co-Owner of Vehicle |
| Vehicle Number Under the Policy |
| Type of Vehicle |
| Type of Emergency Roadside Assistance Coverage |
| Registered State |
| Region Code |
| Type of Digital Identification Card |
| Whether Vehicle is digital identification card eligible |
| Effective Date of Policy |
| Digital Identification Card Template Data |
| Whether Vehicle's Registered State accepts digital identification cards |
| Specifications for Formatting Digital Identification Cards |
| Required Textual Information/Verifications |

In certain embodiments, data may be associated with a particular account holder, for example, an automobile insurance policy holder, and stored in identification server 105 or downloaded to mobile device 102. An example of such data is provided in FIG. 11A.

Figure 4:
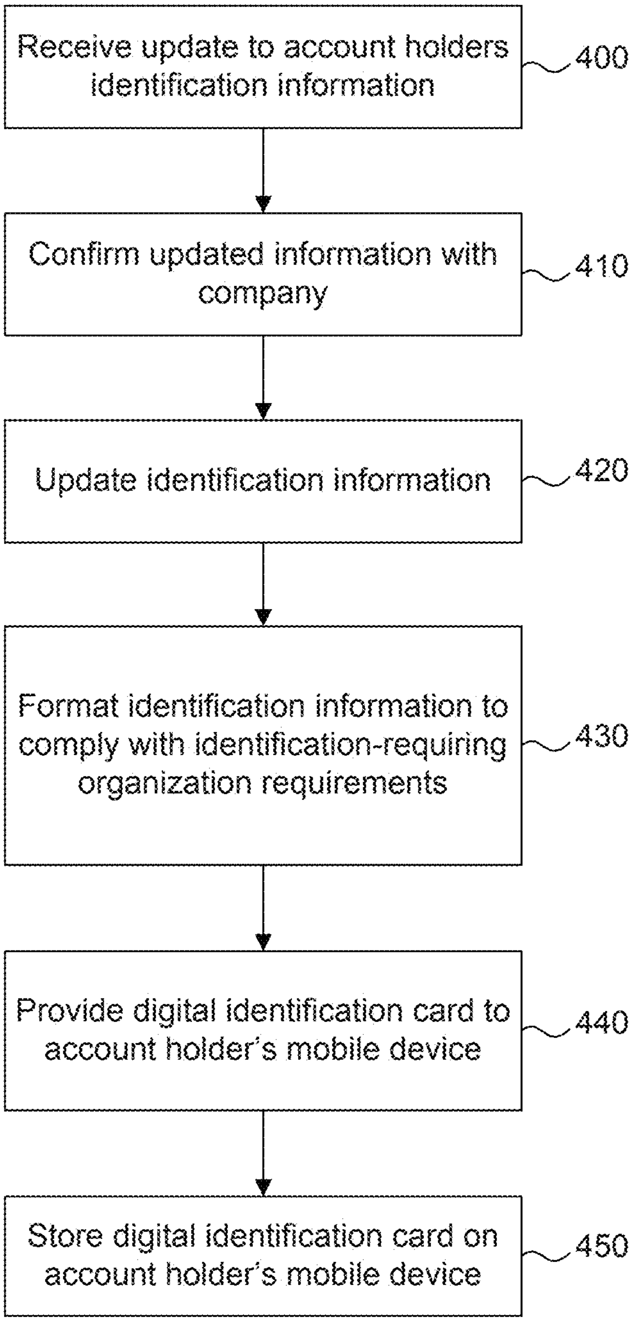
FIG. 4 illustrates a flowchart of an exemplary digital identification card updating process, consistent with certain disclosed embodiments.

FIG. 4 illustrates a flowchart of an exemplary digital identification card updating process, consistent with the disclosed embodiments. FIG. 4 is described with reference to system 100 of FIG. 1, but one of skill in the art would understand how this description would apply to system 200 and other embodiments.

In certain embodiments, account holder 101 or insurance company 104 may modify the primary policyholder's insurance policy. For example, account holder 101 may update insurance coverage information or change attributes that affect the insurance policy. Account holder 101 may change residencies, and the new residency may fall under the jurisdiction of an IRO with different formatting requirements. Insurance company 106 may update the primary insurance policy based on recent claims, traffic violations, premium changes, bill payments, etc. IRO 106 may update its identification card formatting requirements. Other types of changes requiring an updated digital identification card are contemplated by the disclosed embodiments. In such instances, the disclosed embodiments provide mechanisms that allow the digital identification card stored on mobile device 102 to be updated.

In one embodiment, digital identification server 105 may be configured to update a digital identification card with information provided by account holder 101. For example, digital identification server 105 may be configured to execute a digital identification card generation program to update the digital identification card based on information provided by mobile device 102. In step 400, digital identification server 105 may receive updated identification information from account holder 101. For example, account holder 101 may use mobile device 102 to send updated identification information, which is communicated to digital identification server 105 over Internet 103. Alternatively, mobile device 102 sends the information to insurance company 104 or IRO 106 for verification (Step 410) before the updated identification information is received by digital identification server 105. Updated information originating from insurance company 104 or IRO 106 may also be sent to the digital identification server 105, and a similar method as described below would be performed.

After receiving updated identification information, digital identification server 105 may execute instructions that update the identification information stored at digital identification server 105 (Step 420) and generate the updated digital identification card (Step 430). In certain embodiments, digital identification server 105 may also send the updated information to insurance company 104 and/or IRO 106 so that all entities in system 100 may store the updated identification information.

In certain embodiments, digital identification server 105 may generate the updated digital identification card based on identification information relating to an insurance policy of account holder 101 that is provided by insurance company 104, formatting standards that are provided by IRO 106, and the updated identification information provided by account holder 101, in a manner consistent with that disclosed above.

After the digital identification card is generated, digital identification server 105 may provide the digital identification card to mobile device 102 of account holder 101 over a network, such as Internet 103 (Step 440). Mobile device 102 may receive and store the digital identification card using known processes and mechanisms for downloading and storing digital information (Step 450).

In certain embodiments, the locally stored digital identification mobile app of mobile device 102 may generate the digital identification card. The digital identification mobile app may be provided by digital identification server 105 (e.g., via the server's the digital identification application program). In certain embodiments, digital identification server 105 may provide the digital identification mobile app to mobile device 102 through a mobile app provider, such as iTunes® or Google Play®, using known processes and mechanisms for providing mobile apps. Alternatively, account holder 101 may download the digital identification mobile app from a mobile app provider, using, for example, mobile device 102. An exemplary mobile app is described in U.S. patent application Ser. No. 13/594,787, Methods and Systems for Sharing Insurance Information Through Mobile Applications, which is incorporated herein by reference in its entirety.

The digital identification mobile app stored in mobile device 102 may be configured to generate and display the digital identification card. Mobile device 102 may be configured to execute instructions that enable account holder 101 to access the identification information and IRO formatting requirements using login credentials, such as a self-created username and password, to log into the digital identification mobile app. Other types of login credentials may be used. The digital identification mobile app may be associated with (e.g., developed, provided, operated, or maintained by) insurance company 104 and may be configured to provide administration, management, assistance, or education features, in addition to generating and displaying the digital identification card. For example, the digital identification mobile app may allow account holder 101 to manage his/her insurance policy, such as making changes to his/her coverage, adding drivers or vehicles, or paying bills. Other administrative or managerial functions may be provided. The digital identification mobile app may include functions that allow account holder 101 to provide the digital identification server 105 with updated identification information, request digital identification cards, etc. The digital identification mobile app may execute software that generates one or more interfaces that are displayed by mobile device 102 to provide information to account holder 102 and/or accept input from account holder 102 via known user input mechanisms and processes (e.g., keypad, voice input, etc.).

Mobile device 102 may execute instructions that cause the digital identification app to download a digital identification card via a network, such as Internet 103 (for example, if the digital identification server 105 contains a digital identification card generation program so that digital identification server 105 is configured to generate the digital identification card). Once the digital identification card is stored in mobile device 102 (either downloaded from digital identification server 105 or generated by the digital identification mobile app on mobile device 102 and locally stored), it may be displayed without reconnecting to a network and without additional authentication from account holder 101. Thus, the digital identification card may be used as a hard copy identification card, accessible to account holder 101 using mobile device 102 without a network connection. The digital identification card can be provided to IRO 106 (i.e., a representative of the IRO 106) via mobile device 102 to satisfy the identification requirements of the IRO 106. The digital identification card can also be provided to IROs that use identification cards formatted to the requirements of another IRO. For instance, mobile device 102 may display the digital identification card for viewing by a representative of the IRO that issued the identification or a representative of an IRO that accepts the identification issued by the first IRO. Mobile device 102 may transfer data reflecting the digital identification card to IRO 106 or a third party via wireless communications protocols and mechanisms such as near field communications (NFC), Bluetooth, etc.

Figure 5:
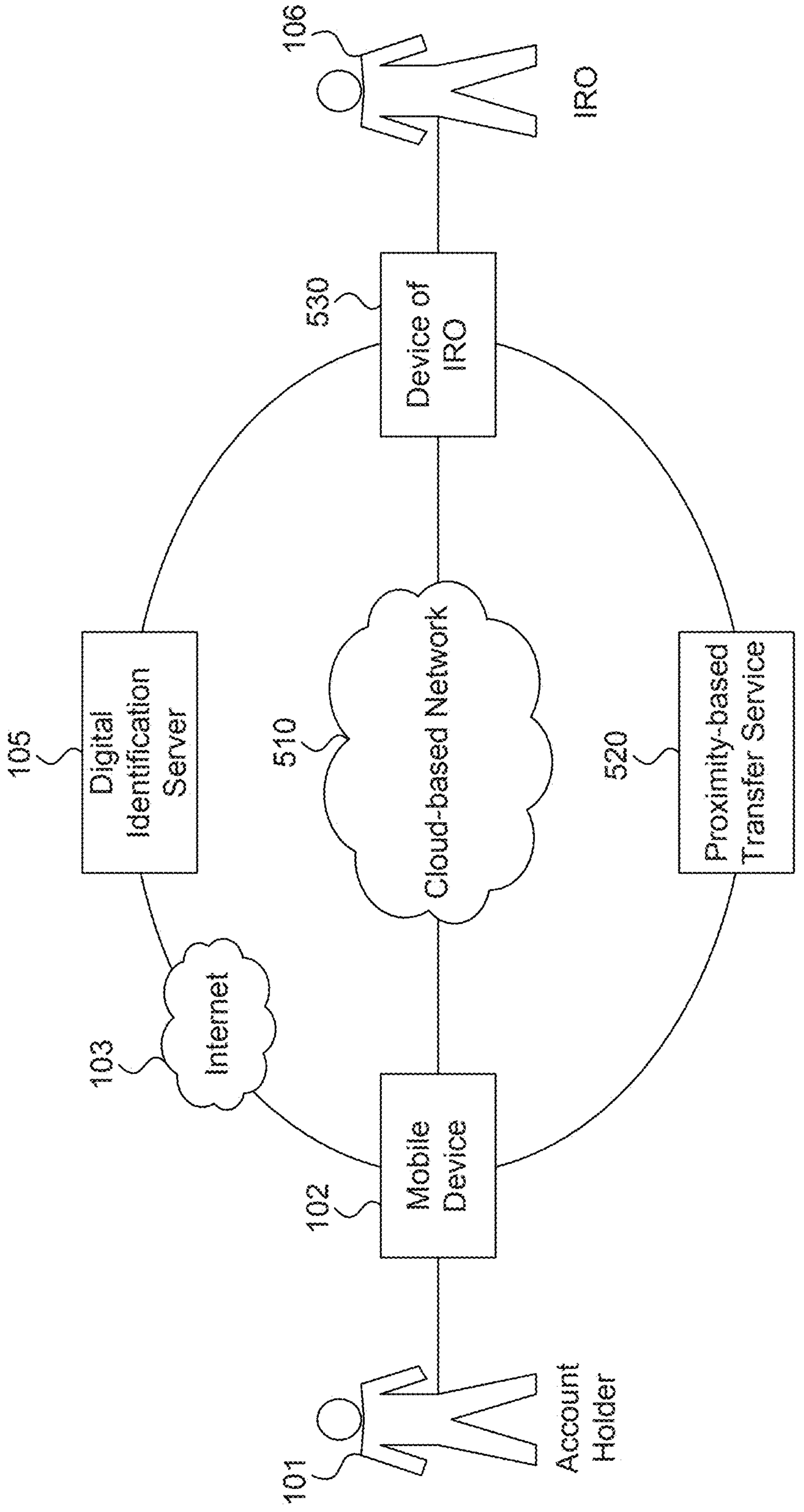
FIG. 5 illustrates an exemplary system for transferring identification information from an account holder's mobile device to the device of an identification-requiring organization, consistent with certain disclosed embodiments.

FIG. 5 illustrates an exemplary system 500 for transferring identification information from an account holder's mobile device to the device of an IRO or third party, consistent with certain disclosed embodiments.

System 500 includes, for example, an account holder 101 with access to a mobile device 102. Mobile device 102 may store the digital identification card for account holder 101. System 500 also includes, for example, one or more digital identification servers 105, one or more networks such as cloud-based network 510, or one or more proximity-based transfer services 520. As shown in exemplary system 500 of FIG. 5, the digital identification server 105, cloud-based network 510, or proximity-based service 520 are in communication with the device 530 of IRO 106 (or a representative of the IRO 106, a third party, or a representative of the third party). Device 530 may be any suitable server, workstation, PC, laptop computer, PDA, Internet appliance, handheld device, cellular telephone, wireless device, or a combination of such devices. Using one of the transfer mechanisms of exemplary system 500, mobile device 102 may electronically transfer identification information to IRO 106 (or the representative of the IRO 106, a third party, or the representative of the third party). The transfer is further described in FIG. 6, below. For example, once a representative of IRO 106 (or a software process executed by a computer system associated with IRO 106) confirms that the digital identification card meets one or more standards of IRO 106, the representative of the IRO 106 (or a software process executed by a computer system associated with IRO 106) may transfer the identification information on the card to device 530 which is used to populate one or more forms or documents for IRO 106. In one embodiment, the identification information may contain metadata identifiable and compatible with the components, infrastructure, and other elements of device 530 and/or IRO 106 such that the identification information can be used by the systems of IRO 106.

In certain embodiments, system 500, or one or more components of system 500, may be configured to execute processes that provide efficient, secure, and user friendly electronic transfer of identification information from digital identification cards relating to insurance policies provided by insurance company 104.

Figure 6:
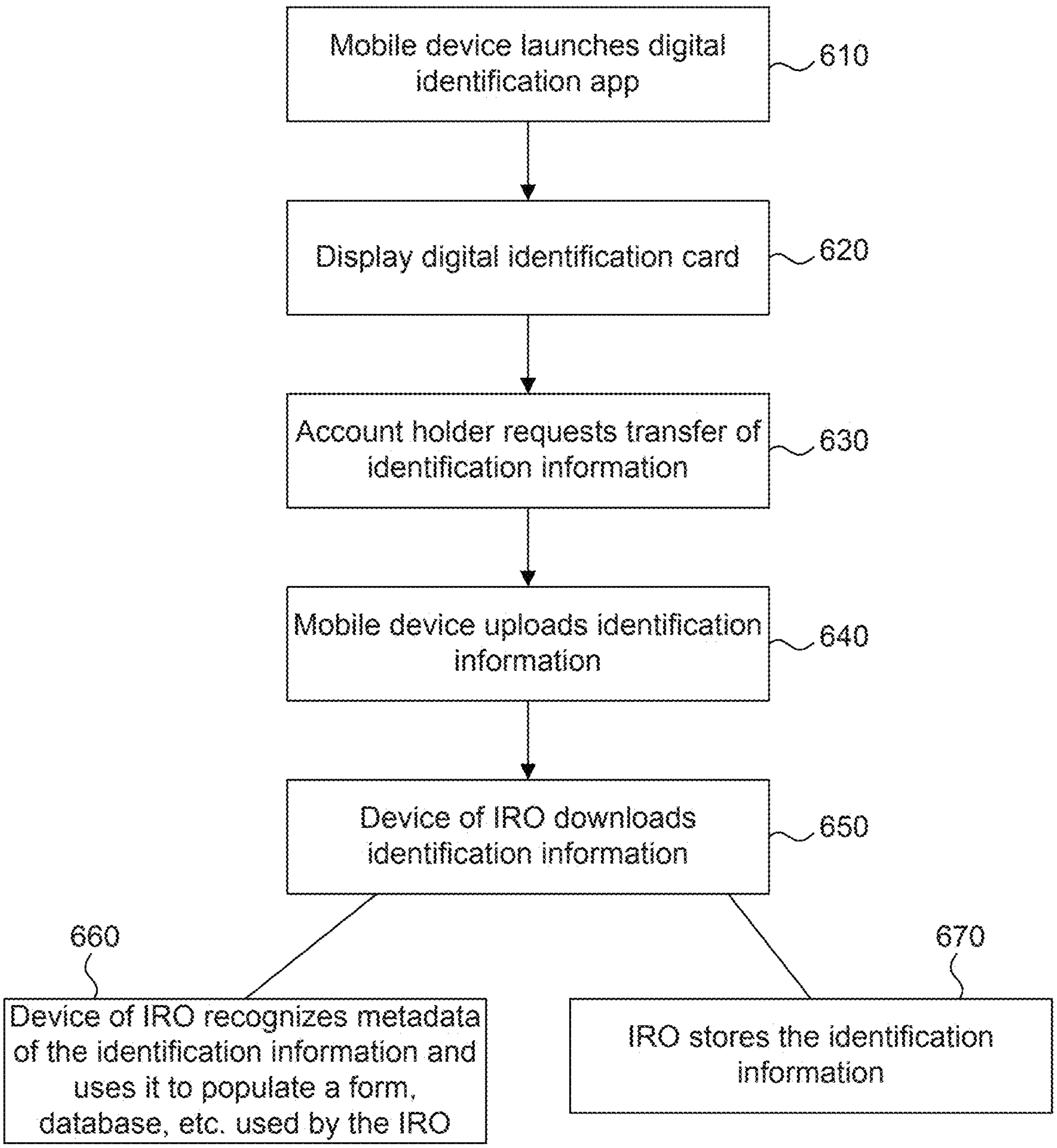
FIG. 6 illustrates a flowchart of an exemplary electronic transfer of identification information from an account holder's mobile device to the device of an identification-requiring organization, consistent with certain disclosed embodiments.

FIG. 6 illustrates a flowchart of an exemplary electronic transfer of identification information from an account holder's mobile device to the device of an IRO (or the representative of the IRO 106, a third party, or the representative of the third party), consistent with certain disclosed embodiments. FIG. 6 is described with reference to system 500 of FIG. 5 and system 100 of FIG. 1, but one of skill in the art would understand how this description would apply to system 200 and other embodiments. It is also contemplated that the account holder may wish to transfer identification information from an account holder's mobile device to a device associated with an insurance company 104. A similar method as described below in relation to IRO 106 could be implemented for such transfers to insurance company 104.

In certain embodiments, account holder 101 may wish to electronically transfer identification information to the device of IRO 106. For example, account holder 101 may wish to transfer insurance policy identification information to IRO 106 as a part of reporting an automobile accident relating to a vehicle covered by the insurance policy. To begin, mobile device 102 may execute software instructions that receive a request to launch the digital identification mobile app stored on mobile device 102, and in response to the request, mobile device 102 may execute software that launches the digital identification mobile app (Step 610). The digital identification mobile app may be configured to automatically display the stored digital identification card upon launching the digital identification mobile app (Step 620). After the digital identification mobile app is initiated, mobile device 102 may receive input from account holder 101 to generate and send a request to transfer some or all of the identification information to the device 530 of IRO 106 (Step 630). The mobile device 102 then uploads the identification information using either a network connection to the digital identification server, another network such as a cloud-based network, or a proximity-based transfer service (Step 640).

In certain embodiments, device 530 may be automatically updated through known uploading or push technologies. For example, mobile device 102 may be combined to execute instructions that push the information to device 530 via a proximity-based transfer service, such as Bump™ or Near Field Communication (NFC). In one embodiment, a proximity-based transfer service 520 may be used to make the proximity-based transfer of data. In this embodiment, mobile device 102 of account holder 101 initiates the transfer of data stored on its digital identification mobile app to service 520, and device 530 invokes service 520. Service 520 determines whether device 530 is within a permitted proximity to mobile device 102, and if so, transfers the data to the device 530. Such proximity data transfer techniques (e.g., Bump, NFC, and similar mechanisms) would be known to a person of ordinary skill in the art.

Alternatively, mobile device 102 may transfer the information to the device 530 without a real-time connection to the device 530. In system 500, mobile device 102 of account holder 101 may be configured to execute software processes that (upon user request or based on determined events) upload some or all of the identification information stored in mobile device 102 to one or more computers (e.g., servers) implemented in a cloud-based network 510. Cloud-based network 510 may include one or more servers or other computer systems and data storage devices that enable cloud-based computing known to those skilled in the art. In one embodiment, cloud-based network 510 may be provided by insurance company 104. In another embodiment, cloud-based network 510 may be associated with digital identification server 105 (e.g., may be part of the same computing network, components, etc.). In another embodiment, mobile device 102 may connect via a network such as the internet to upload some or all of the identification information to digital identification server 105. In one embodiment, digital identification server 105 (and/or cloud-based network 510) may provide IRO 106 (via device 530) with a token password that is used to access the information stored on digital identification server 105 (and/or cloud-based network 510). Device 530 may be configured to execute processes that access digital identification server 105 or cloud-based network 510, including synchronization and handshaking processes known in the art. Device 530 may download the identification information stored in the digital identification server or the server of cloud-based network 510.

Once the identification information has been transferred to device 530 (Step 650), device 530 may recognize the metadata of the identification information and use it to populate a form, database, etc., used by IRO 106 (Step 670). Alternatively, IRO 106 may store the identification information for later use (Step 660).

Figure 7:
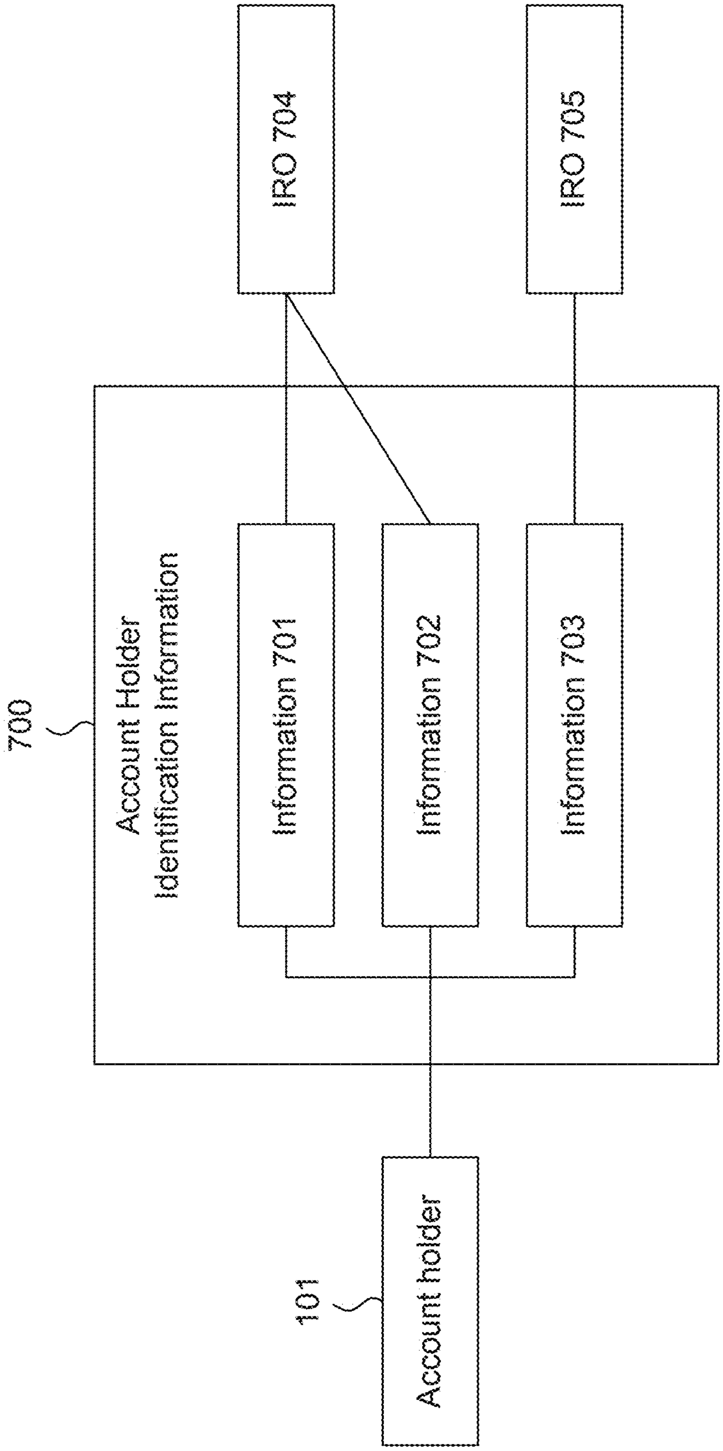
FIG. 7 illustrates a diagram of an exemplary relationship between the account holder identification information accessible to the account holder and identification-requiring organizations, consistent with certain disclosed embodiments.

FIG. 7 illustrates a diagram of an exemplary data structure that may be shared between different entities, persons, etc., consistent with certain embodiments. For example, a data structure hosting identification information 700 may be made accessible to an account holder, various IROs, and various third parties. It is contemplated that the same digital identification card may be used by several IROs and third parties, and access to the electronic identification information used to generate the digital identification card can be tailored to meet each of the entities' requirements. In one embodiment, the data structure may include one or more components of information 701, 702, 703.

For example, a proof of insurance identification card may be used by both the highway patrol (e.g., when issuing a citation) and the Department of Motor Vehicles (e.g., when verifying proof of insurance before issuing a driver's license). As shown, account holder 101 may have access to, and store information about, the account holder's identification information 700 (e.g., information 701, 702, and 703). IRO 704 may only require information 701 and 702, so it may only be given access to, and store, information 701 and 702. IRO 705 may only require information 703, so it may only be given access to, and store, information 703. As the identification information is updated, the access to the information in the account holder's identification information 700 may change based on controls set by account holder 101 (via mobile device 102), insurance company 104, the IRO, and/or third parties. These components may be configured to execute instructions to add, delete, or modify account information for an account associated with account holder 101.

Figure 8:
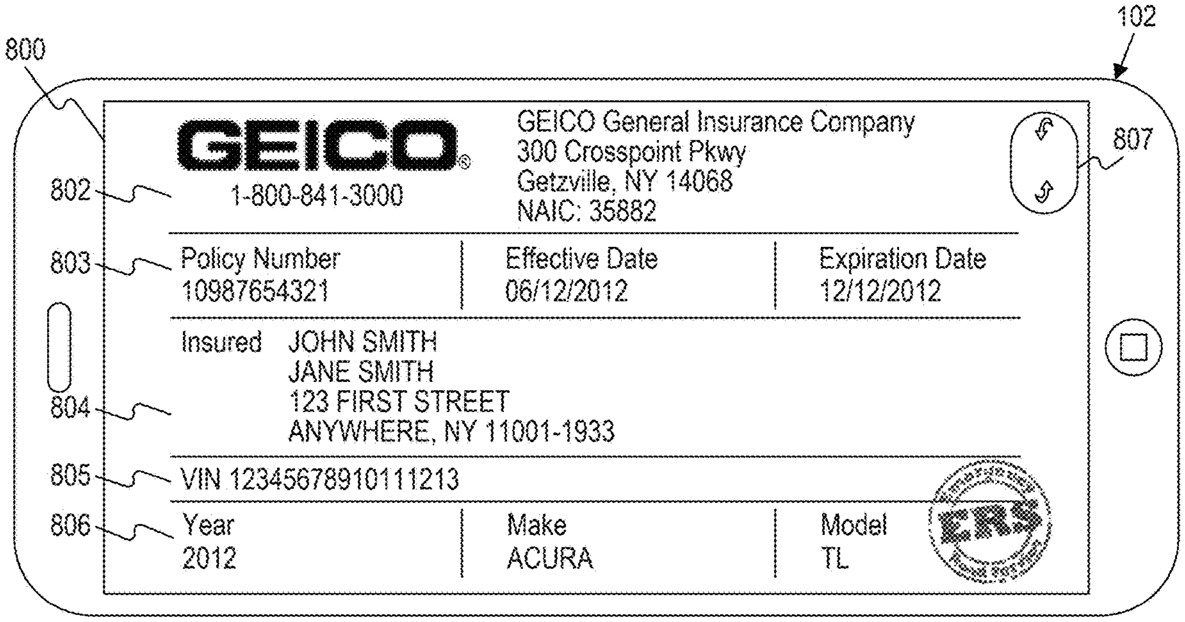
FIG. 8 illustrates an exemplary digital identification card that may be displayed on a mobile device, consistent with disclosed embodiments.
Figure 8:
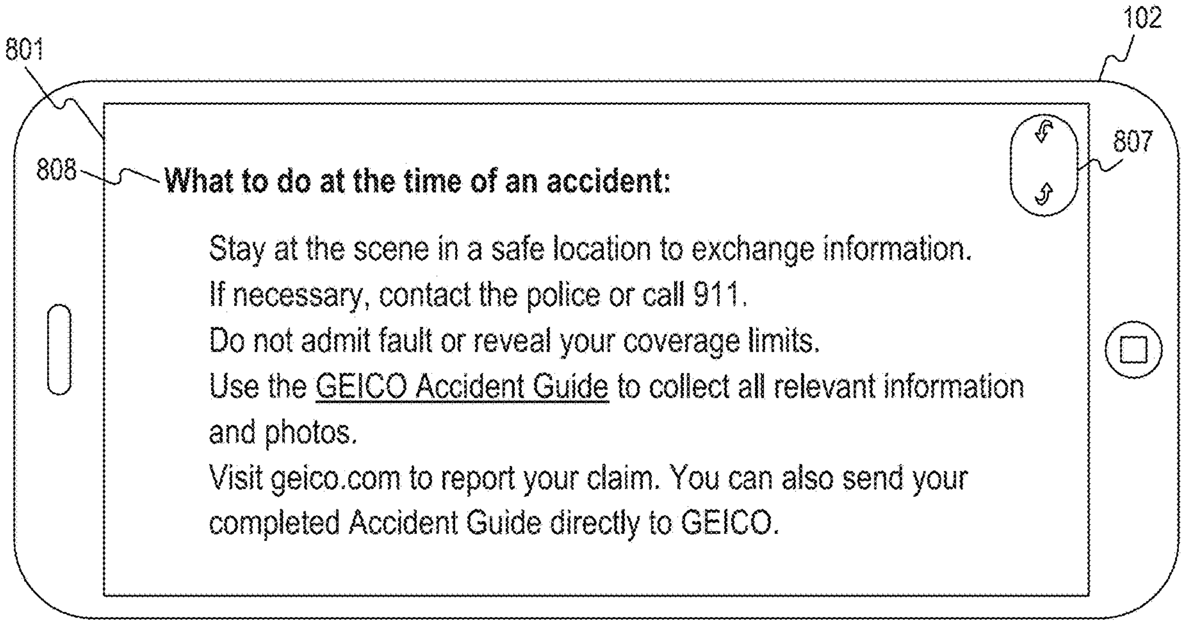
Figure 9:
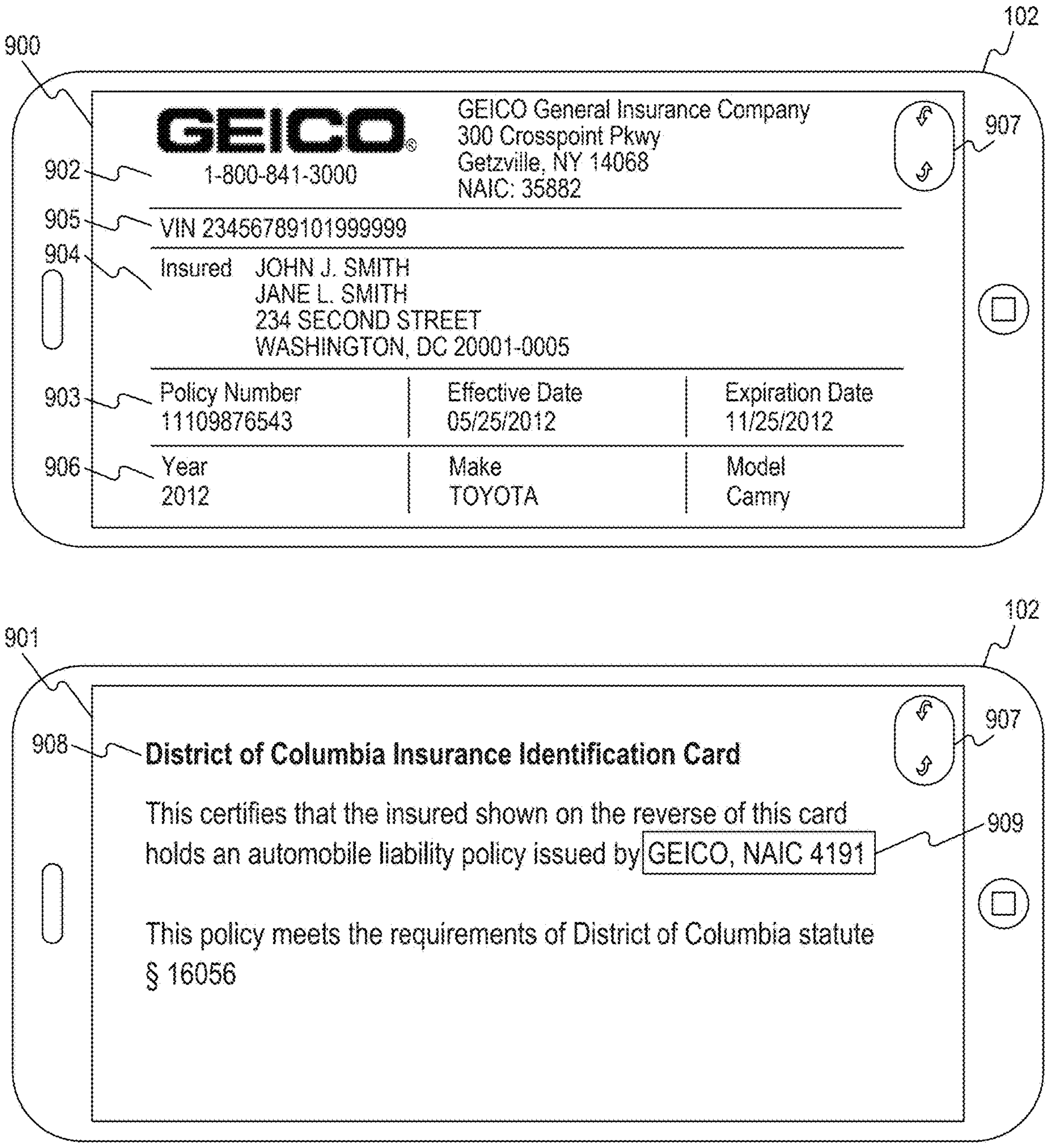
FIG. 9 illustrates a second exemplary digital identification card that may be displayed on a mobile device, consistent with disclosed embodiments.
Figure 10:
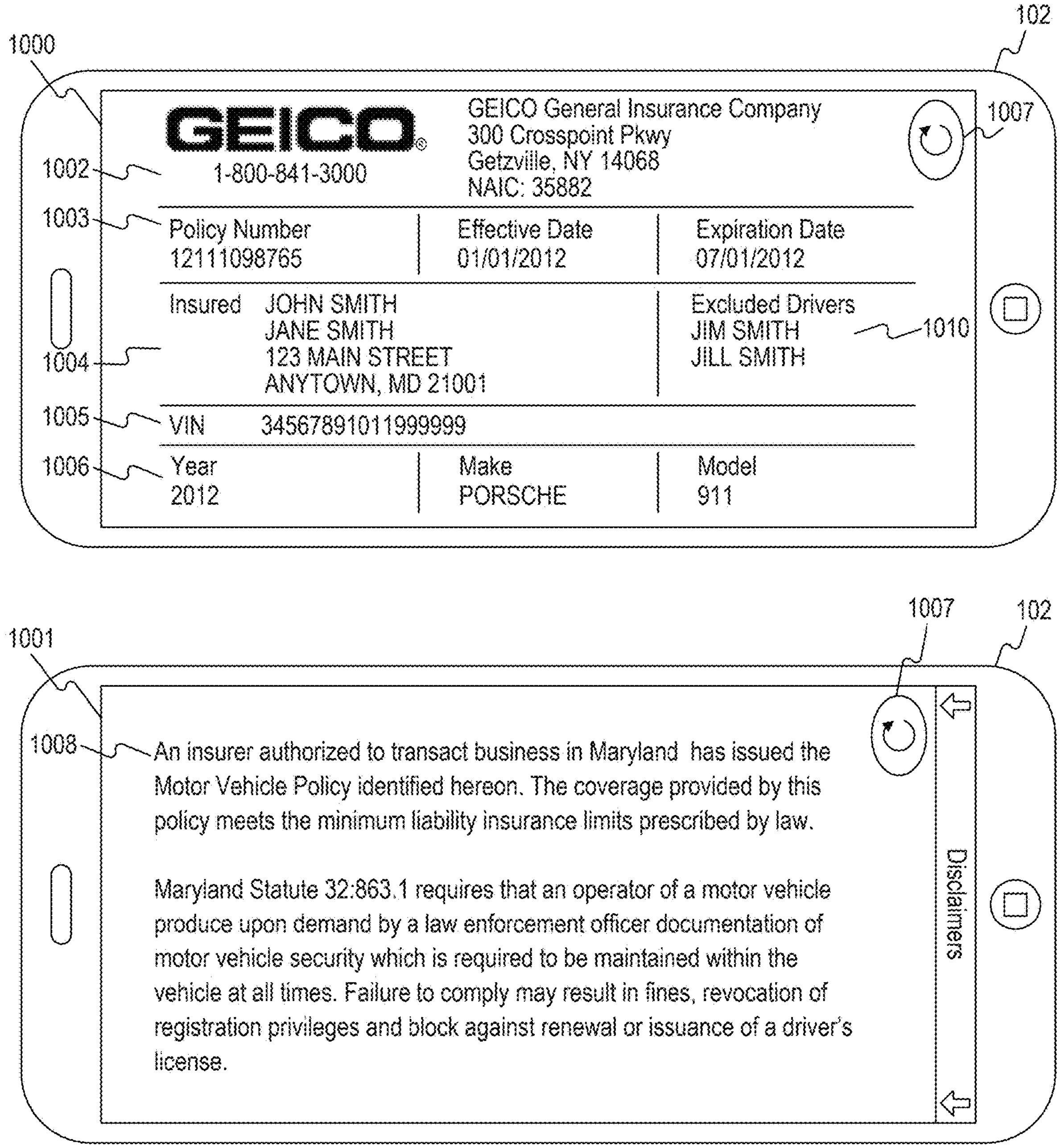
FIG. 10 illustrates a third exemplary digital identification card that may be displayed on a mobile device, consistent with disclosed embodiments

FIG. 8, FIG. 9, and FIG. 10 illustrate exemplary front and back portions (800-801; 900-901; 1000-1001) of respective digital identification cards that may be generated by the disclosed embodiments and displayed by a digital identification application executing on mobile device 102. For example, FIG. 8 shows exemplary front (800) and back (801) portions of a digital identification card for an automobile owner living in New York that may be displayed on mobile device 102. The front (800) and back (801) portions of the digital identification card may correspond to front and back portions of a hard copy proof of insurance identification card of the New York automobile owner. Similarly, as shown in the digital identification card displayed on mobile device 102 in FIG. 9, front portion 900 corresponds to the front of a digital identification card reflecting a hard copy proof of insurance identification card, and back portion 901 corresponds to the back of a digital identification card reflecting a hard copy proof of insurance identification card for an automobile owner living in Washington, D.C. And, as shown in the exemplary digital identification card displayed on mobile device 102 in FIG. 10, front portion 1000 corresponds to the front of a digital identification card reflecting a hard copy proof of insurance identification card and back portion 1001 corresponds to the back of a digital identification card reflecting a hard copy proof of insurance identification card for an automobile owner living in Maryland. The digital identification cards displayed in FIGS. 8, 9, and 10 are exemplary and are not intended to demonstrate differences among IROs and may not necessarily comply with any IROs in New York, Washington, DC, or Maryland.

In certain embodiments, digital identification server 105 receives insurance company identification information, such as the insurance company name and address, NAIC number, policy number, effective date, and expiration date, from insurance company 104. In certain embodiments, digital identification server 105 receives account holder identification information, such as VIN number, name and address of account holder 101, and vehicle year, make, and model, from account holder 101 via the mobile device 102. Alternatively, digital identification server 105 may receive account holder identification information from insurance company 104. Digital identification server 105 may also receive additional information from account holder 101 and insurance company 104 which are not required by the IRO 106 but are stored in the digital identification server 105 (see, e.g., FIG. 7, wherein IRO 704 only requires information 701 and 702, but digital identification server 105 stores information 701, 702, and 703).

In certain embodiments, digital identification server 105 receives formatting standards and requirements for types of identification information from IRO 106. Based on these standards and requirements, digital identification server 105 may, for example, generate and transmit the digital identification card via internet 103 to mobile device 102. The digital identification mobile app on mobile device 102 may be configured to display the digital identification card. In certain embodiments, the digital identification mobile app may be configured to store the digital identification card so, for example, the digital identification card can be displayed without a connection to the network.

Alternatively, the digital identification mobile app may be configured to generate the digital identification card. That is, instead of the digital identification server 105 generating and transmitting the digital identification card, the digital identification server 105 transmits, via internet 103, the digital identification information and formatting requirements to the digital identification mobile app and the digital identification mobile app generates the digital identification card using the formatting standards to format and populate the fields of the digital identification card. In certain embodiments, after generating the digital identification card, the digital identification mobile app may be configured to store the digital identification card in a memory of mobile device 102 so, for example, it can be displayed without a connection to the network.

As shown in FIGS. 8-10, fields 802, 902, and 1002, respectively provide the identification information supplied by insurance company 104 (e.g., the name and address of insurance company 104. Fields 803, 903, and 1003, each provide the policy number, effective date, and expiration date; however, they are provided in different locations of identification cards 800 and 1000 as compared to 900 due to the different formatting requirements of the IROs (e.g., the departments of motor vehicles of New York and Maryland may have different formatting requirements than Washington, D.C.). Although the name and address identification information for the insured is shown in generally the middle of each card in fields 804, 904, and 1004, and the vehicle information fields 806, 906, and 1006 are at the bottom of each card, the different formatting requirements are again evident in the placement of the VIN number fields 805 and 1005 as compared to 905 for the three digital identification cards. Additionally, FIG. 10 includes field 1010, which is absent in the other two digital identification cards, due to the different IRO formatting requirements.

In certain embodiments, the digital identification app may be configured to generate and display icons 807, 907, and 1007, which allow a user to digitally 'flip' the identification card over to digitally display the information that may be on the other side if the identification card. For example, a user may select icon 807 included in digital identification card portion 800 (corresponding to the front portion of a digital identification card reflecting a front view of a hard copy identification card) that mobile device 102 displays by executing the digital identification app, which causes digital identification card portion 801 (corresponding to the back portion of a digital identification card reflecting a back view of a hard copy identification card) to be displayed.

Digital identification cards may include additional information that may not be required by IRO 106. For example, digital identification card 801 contains field 808, which is populated with information supplied by insurance company 104 that is not required by IRO 106.

In certain embodiments, fields may contain links to other documents or websites, such as the link to the GEICO® Accident Guide shown in field 808. Links may generally be included in any field as long as the links comply with IRO 106 formatting requirements and are not prohibited by IRO 106.

As shown in FIG. 9, IRO 106 requires identification information 908 to be displayed on the back of this identification card. In this exemplary field, statements required by IRO 106 are displayed in field 908 with identification information particular to insurance company 104 displayed in field 909. It is contemplated that the digital identification app may be configured to display fields within fields, such as is shown in fields 908 and 909.

FIG. 10, field 1008 provides another example of textual information required by the formatting requirements of IRO 106 to be displayed on the back portion of the digital identification card.

In certain aspects, the disclosed embodiments may generate a digital identification card with variable field sizes, headers, etc. according to the requirements of the various IROs. For example, digital identification server 105 or the digital identification app may be configured to generate a digital identification card with field sizes, headers, fonts, etc. that comply with the formatting standards set by IRO 106, containing the types of identification information required by IRO 106, and populated with the identification information supplied by account holder 101, insurance company 104, or IRO 106. For instance, digital identification server 105 or the digital identification app may be configured to generate a digital identification card with standard fields, etc. that can be populated by different IROs with different identification requirements.

In certain embodiments, the digital identification app may be a runtime application wherein the set of specification parameters that define a template for IRO 106 which may be used to format the identification information for the IRO.

In certain embodiments, digital identification server 105 or the digital identification mobile app may be configured with several different template digital identification cards that can be populated with different identification information requirements. For instance, the digital identification server 105 or the digital identification mobile app may store digital identification card templates, each associated with a particular IRO 106. The digital identification server 105 or the digital identification mobile app is configured to receive information about IRO 106, select the appropriate digital identification card template, and populate the template with the identification information required by IRO 106.

Figure 11A:
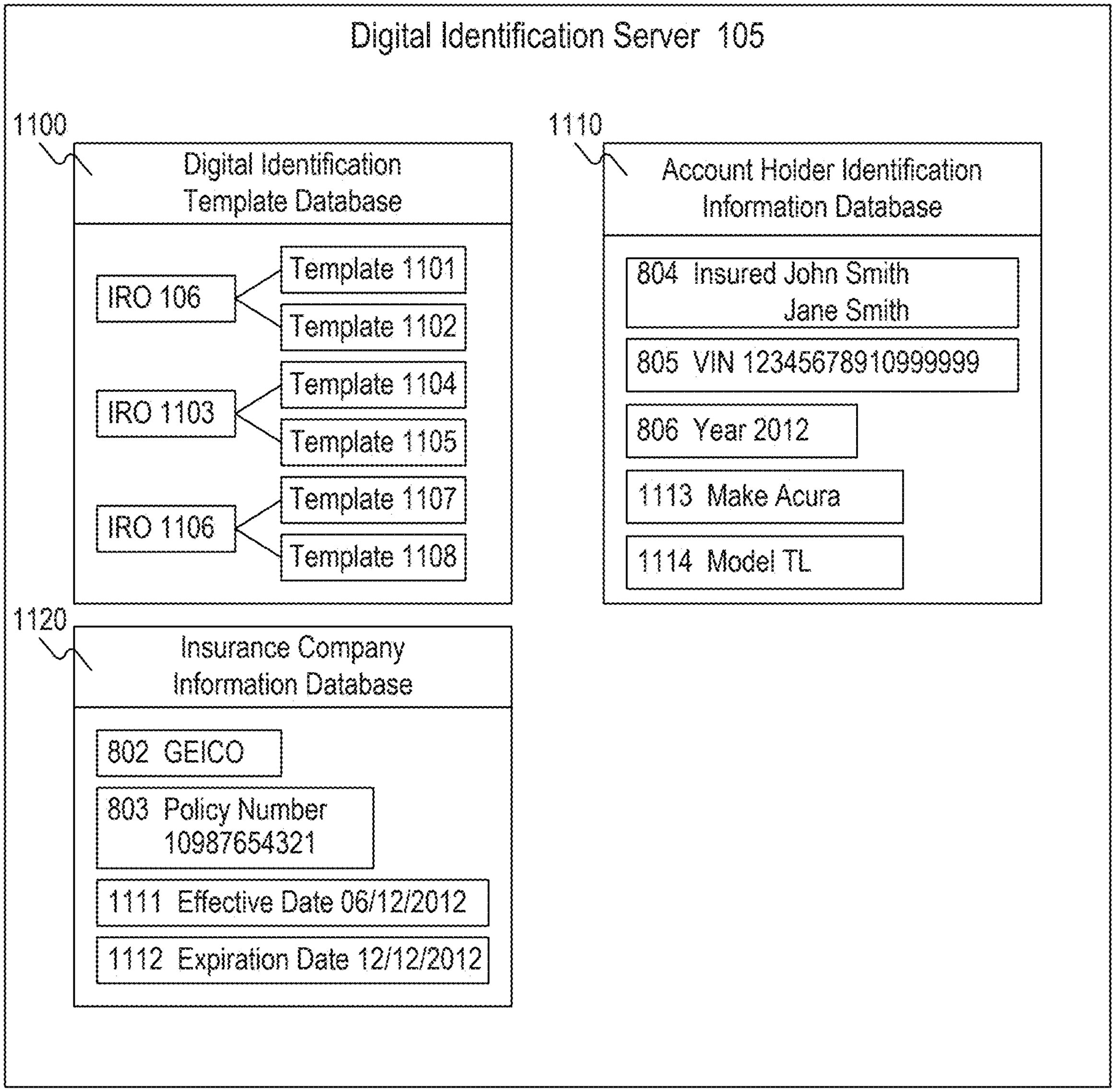
FIG. 11A illustrates an exemplary configuration for a digital identification server, consistent with disclosed embodiments.
Figure 11B:
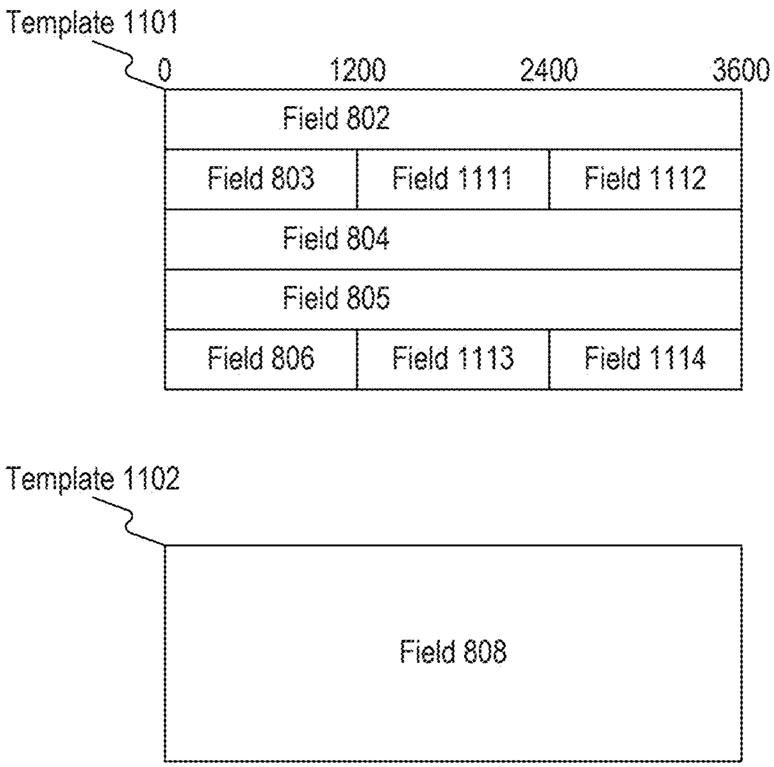
FIG. 11B illustrates an exemplary digital identification card template that may be generated by a digital identification server, consistent with disclosed embodiments.

FIG. 11A illustrates an exemplary configuration for a digital identification server 105, consistent with disclosed embodiments. As shown in FIG. 11A, digital identification server 105 may include digital identification template database 1100, which associates formatting information for each of templates 1101, 1102, 1104, 1105, 1107, and 1108 with IROs 106, 1103, and 1106 as appropriate. In certain embodiments, the disclosed embodiments may associate formatting information with each IRO may occur, for example, when each IRO transmits the formatting information to digital identification server 105 (see step 301 of FIG. 3). The digital identification server 105 may be configured to access formatting information when a request for a digital identification card is received. For example, when a request to provide a digital identification card for account holder 101 for IRO 106 is received, the digital identification server may retrieve template 1101 and 1102 associated with IRO 106 from digital identification template database 1100. Digital identification server 105 may be configured to use formatting information from template 1000 to create a digital identification card with fields 802, 803, 804, 805, 806, 1111, 1112, 1113, and 1114, formatted as shown in digital identification card template 1100 in FIG. 10B. Digital identification server 105 may create a digital identification card data structure 1100 that includes a set of fields (e.g., nine fields) having determined field sizes (e.g., certain number of bits, certain number of alphanumeric characters, etc.), based on a standard accepted and used by IRO 106.

Digital identification server 105 may also be configured to access account holder identification information database 1110 of FIG. 11A. In one example, digital identification server 105 may be configured to use information 804, 805, 806, 1113, and 1114 to populate fields 804, 805, 806, 1113, and 1114 of digital identification card template 1100 to create the digital identification card 800 of FIG. 8.

In another embodiment, digital identification server 105 may also be configured to access insurance company information from insurance company information database 1120 of FIG. 11A. In one example, digital identification server 105 may be configured to use the insurance company information 802, 803, 808, 1111, and 1112 accessed from database 1120 to populate the fields 802, 803, 808, 1111, and 1112 of digital identification card templates 1101 and 1102 to create the digital identification card front and back portions 800 and 801 of FIG. 8.

In certain embodiments, account holder identification information database 1110 may include identification information provided by both account holder 101 and insurance company 104. Alternatively, account holder identification information database 1110 may contain only identification information provided by account holder 101 and a separate insurance company information database 1120 may contain identification information provided by insurance company 104. In certain embodiments, account holder identification information database 1110, insurance company information database 1120, and digital identification template database 1100 may be combined into a single database. The databases may be located on a single server, or may be distributed on several servers. One of skill in the art would understand the various database configurations advantageous to this disclosure. The above-described devices and subsystems of disclosed embodiments can include, for example, any suitable servers, workstations, PCs, laptop computers, PDAs, Internet appliances, handheld devices, cellular telephones, wireless devices, or other devices capable of performing the processes of the exemplary embodiments.

All or a portion of the devices and subsystems of the exemplary embodiments may be implemented using one or more general purpose computer systems, microprocessors, digital signal processors, micro-controllers, and the like, programmed according to the teachings of exemplary embodiments, as will be appreciated by those of ordinary skill in the computer and software arts. To implement such an embodiment as well as other embodiments, a single computer system may be programmed to perform the special purpose functions of one or more of the devices and subsystems of the disclosed embodiments. On the other hand, two or more programmed computer systems or devices may be substituted for any one of the devices and subsystems of the exemplary embodiments. Accordingly, principles and advantages of distributed processing, such as redundancy, replication, and the like, increase the robustness and performance of the devices and subsystems of the exemplary embodiments.

The devices and subsystems of the exemplary embodiments can communicate with each other using any suitable protocol and can be implemented using one or more programmed computer systems or devices that are consistent with the disclosed embodiments. One or more communication mechanisms may be used with disclosed embodiments, including, but not limited to, Internet access, telecommunications in any suitable form (e.g., voice, modem, and the like), and wireless communications media, and the like. For example, employed communications networks or links can include one or more wireless communications networks, cellular communications networks, 3G, 4G, etc. type communications networks, Public Switched Telephone Network (PSTNs), Packet Data Networks (PDNs), the Internet, intranets, or a combination thereof.

Appropriate software may be prepared by programmers of ordinary skill based on the teachings of the exemplary embodiments. Further, the devices and subsystems of the exemplary embodiments can be implemented on the World Wide Web. In addition, the devices and subsystems of exemplary embodiments may be implemented by the preparation of application-specific integrated circuits or by interconnecting an appropriate network of conventional component circuits, as will be appreciated by those skilled in the electrical art. Thus, the exemplary embodiments are not limited to any specific combination of hardware circuitry and/or software.

Stored on any one or on a combination of solid, tangible computer readable media, disclosed embodiments may include instructions programmed according to the disclosed teachings for controlling the devices and subsystems of embodiments, for driving the devices and subsystems of embodiments, and for enabling the devices and subsystems of embodiments to interact with a user. Such software may include, but is not limited to, device drivers, firmware, operating systems, development tools, applications software, and the like. Software implementing exemplary embodiments may include any suitable interpretable or executable code mechanism, including but not limited to scripts, interpretable programs, dynamic link libraries (DLLs), Java classes and applets, complete executable programs, and Common Object Request Broker Architecture (CORBA) objects implemented using a variety of programming languages, such as Java, C, C++, JavaScript, or any other now known or later created programming language. Moreover, parts of the processing of the exemplary embodiments can be distributed for better performance, reliability, and cost. The described implementation includes software, but the disclosed embodiments may be implemented as a combination of hardware and software.

In addition to the stored instructions programmed according to the disclosed teachings, devices, and systems of disclosed embodiments may include computer readable media for storing information relating to various processes described herein using data structures, tables, records, and/or other data described herein. Computer readable media can include any tangible suitable medium that participates in providing instructions to a processor for execution. Such a medium may take many forms, including but not limited to, non-volatile media, volatile media, and the like. Non-volatile media can include, for example, hard disks, solid-state devices, optical or magnetic disks, magneto-optical disks, floppy disks, CD-ROM and the like. Volatile media can include dynamic memories, and the like. Common forms of computer-readable media can include, for example, a floppy disk, a flexible disk, hard disk, solid-state devices, magnetic tape, any other suitable magnetic medium, a CD-ROM, CDRW, DVD, SD cards, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, or any other suitable medium from which a computer or processor can read and execute.

The foregoing descriptions have been presented for purposes of illustration and description. They are not exhaustive and do not limit the disclosed embodiments to the precise form disclosed. Modifications and variations are possible in light of the above teachings or may be acquired from practicing the disclosed embodiments.

For example, while the disclosed embodiments describe aspects that allow account holders 101 to electronically transfer identification information to IROs 106 or insurance companies 104, other embodiments may be implemented that enable account holders 101 to electronically transfer identification information to other third parties.

In another embodiment, if device 530 of IRO 106 (or a third party) is a mobile device, the digital identification app of mobile device 102 provided by the disclosed embodiments may be configured to automatically perform processes, when executed by a processor (e.g., such as a processor in mobile device 102), that electronically send identification information through direct wireless (e.g., Bluetooth) technologies to device 530. In such embodiments, the direct identification app may perform one or more processes that determine the identity of the device 530 (e.g., phone number, ID number, etc.) when establishing a communication session between mobile device 102 and device 530. The digital identification mobile app processes may determine the identity of the IRO 106 based on the identity of device 530 or based on a table, list, etc. of IROs requiring identification from the account holder 101.

It is intended that the specification and examples be considered as exemplary only, with the true scope and spirit being indicated by the following claims. Other embodiments may be contemplated within the scope of the disclosed invention. For example, while certain disclosed embodiments include a digital identification mobile app that may be configured to generate and display digital identification cards in accordance with certain embodiments, the disclosed embodiments may be implemented using other types of software to perform the same or similar processes. Accordingly, the disclosed embodiments are not limited to the use of mobile apps, but may incorporate and implement other types of software that may be downloaded by mobile device 102 and executed to perform one or more processes consistent with the disclosed embodiments.

The invention claimed is:

1. A mobile device for providing digital identification cards, comprising:

a memory storing software instructions; and at least one processor coupled to the memory and configured to execute the software instructions to:

access identification information associated with an account holder, the identification information comprising a first address associated with a first set of jurisdictional standards of at least one identification-requiring organization;

detect an update to the identification information of the account holder that includes a second address of the account holder, wherein the second address of the account holder is associated with a second set of jurisdictional standards differing from the first set of jurisdictional standards associated with the first address of the account holder;

receive formatting information reflecting a visual appearance of an updated digital identification card based on the second set of jurisdictional standards of the at least one identification-requiring organization;

generate an updated digital identification card based on the updated identification information and the formatting information; and cause a display of the updated digital identification card.

2. The mobile device of claim 1, wherein the formatting information comprises at least one of a field size, field shape, font type, font size, text color, field color, background color, text transparency, field transparency, displayed text, image information, or watermark information.

3. The mobile device of claim 1, wherein the at least one processor is further configured to execute the software instructions to further update the updated digital identification card based on a change to the second set of jurisdictional standards of the at least one identification-requiring organization.

4. The mobile device of claim 1, wherein the at least one processor is further configured to execute the software instructions to: store the updated digital identification card in memory and retrieve the stored digital identification card in response to a request for display.

5. The mobile device of claim 1, wherein the at least one processor is further configured to execute the software instructions to: detect the update to the identification information based on input received at the mobile device and transmit the updated identification information to a remote server.

6. The mobile device of claim 1, wherein the at least one processor is further configured to execute the software instructions to transmit the updated identification information to a computing device of the at least one identification-requiring organization.

7. The mobile device of claim 1, wherein the at least one processor is further configured to execute the software instructions to periodically determine whether the formatting information reflecting the visual appearance of the updated digital identification card has changed.

8. The mobile device of claim 1, wherein the at least one processor is further configured to execute the software instructions to generate the updated digital identification card using a pre-stored template on the mobile device.

9. The mobile device of claim 1, wherein the at least one processor is further configured to execute the software instructions to confirm the updated identification information with the at least one identification-requiring organization.

10. A computer-implemented method for providing digital identification cards, comprising:

accessing identification information associated with an account holder, the identification information comprising a first address associated with a first set of jurisdictional standards of at least one identification-requiring organization;

detecting, using a mobile device, an update to the identification information of the account holder that includes a second address of the account holder, wherein the second address of the account holder is associated with a second set of jurisdictional standards differing from the first set of jurisdictional standards associated with the first address of the account holder;

receiving formatting information reflecting a visual appearance for an updated digital identification card based on the second set of jurisdictional standards of the at least one identification-requiring organization;

generating the updated digital identification card based on the updated identification information and the formatting information; and causing a display of the updated digital identification card.

11. The computer-implemented method of claim 10, wherein the mobile device is configured to execute a digital identification mobile application, and the updated digital identification card is generated by the digital identification mobile application.

12. The computer-implemented method of claim 11, wherein the digital identification mobile application is configured with several different template digital identification cards populated with different identification information requirements.

13. The computer-implemented method of claim 10, further comprising: receiving new formatting information based on a change to the second set of jurisdictional standards of the at least one identification-requiring organization; and updating the format of the digital identification card based on the new formatting information.

14. The computer-implemented method of claim 10, further comprising: detecting the update to the identification information as an input to the mobile device; and transmitting the updated identification information to a digital identification server.

15. The computer-implemented method of claim 10, wherein the updated digital identification card associated with the second set of jurisdictional standards includes at least one detail which is absent in a first digital identification card associated with the first set of jurisdictional standards.

16. The computer-implemented method of claim 10, wherein the identification information associated with an account holder is stored in an account holder identification information database, and the method further comprises: accessing information-requiring organization information associated with the at least one identification-requiring organization, wherein the information-requiring organization information is stored in an information-requiring organization database.

17. A server for providing digital identification cards, comprising:

a memory storing software instructions; and one or more processors each coupled to the memory and configured to execute the software instructions to:

access identification information associated with an account holder, the identification information comprising a first address associated with a first set of jurisdictional standards of at least one identification-requiring organization;

detect an update to the identification information of the account holder that includes a second address of the account holder, wherein the second address of the account holder is associated with a second set of jurisdictional standards differing from the first set of jurisdictional standards associated with the first address of the account holder;

receive formatting information reflecting a visual appearance of an updated digital identification card based on the second set of jurisdictional standards of the at least one identification-requiring organization;

generate an updated digital identification card based on the updated identification information and the formatting information; and cause a display of the updated digital identification card.

18. The server of claim 17, wherein the one or more processors are further configured to execute the software instructions to further update the updated digital identification card based on a change to the second set of jurisdictional standards of the at least one identification-requiring organization.

19. The server of claim 17, wherein the one or more processors are further configured to execute the software instructions to receive new formatting information based on a change to the second set of jurisdictional standards of the at least one identification-requiring organization; and updating the format of the digital identification card based on the new formatting information.

20. The server of claim 17, wherein the one or more processors are further configured to execute the software instructions to access information-requiring organization information associated with the at least one identification-requiring organization, wherein the information-requiring organization information is stored in an information-requiring organization database.

* * * * *